United States Patent
Yin et al.

(10) Patent No.: US 7,106,025 B1
(45) Date of Patent: Sep. 12, 2006

(54) CANCELLATION OF DEAD TIME EFFECTS FOR REDUCING COMMON MODE VOLTAGES

(75) Inventors: Qiang Yin, Shanghai (CN); Russel J. Kerkman, Milwaukee, WI (US); Richard A. Lukaszewski, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 20 days.

(21) Appl. No.: 11/068,196

(22) Filed: Feb. 28, 2005

(51) Int. Cl.
*H02P 5/28* (2006.01)
*H02M 1/12* (2006.01)

(52) U.S. Cl. .................. 318/811; 318/801; 363/41

(58) Field of Classification Search ............ 318/801, 318/811, 806, 812, 254, 245; 363/41
See application file for complete search history.

(56) References Cited

U.S. PATENT DOCUMENTS

| | | | | |
|---|---|---|---|---|
| 5,013,985 A | * | 5/1991 | Itoh et al. ................ 318/558 |
| 5,099,408 A | * | 3/1992 | Chen et al. ................ 363/41 |
| 5,623,192 A | * | 4/1997 | Yamamoto ................ 318/811 |
| 5,633,788 A | * | 5/1997 | Tanaka et al. ............. 363/41 |
| 6,023,417 A | * | 2/2000 | Hava et al. ................ 363/41 |
| 6,324,085 B1 | * | 11/2001 | Kimura et al. ............ 363/132 |
| 6,819,070 B1 | * | 11/2004 | Kerkman et al. .......... 318/434 |
| 2001/0015904 A1 | * | 8/2001 | Kimura et al. ............ 363/131 |
| 2004/0037097 A1 | * | 2/2004 | Deng et al. ................ 363/41 |
| 2004/0160207 A1 | * | 8/2004 | Kerkman et al. .......... 318/801 |
| 2005/0163237 A1 | * | 7/2005 | Katanaya .................. 375/260 |
| 2005/0174076 A1 | * | 8/2005 | Katanaya .................. 318/254 |
| 2006/0091833 A1 | * | 5/2006 | Kitajima et al. ........... 318/109 |

OTHER PUBLICATIONS

Yen-Shin Lai, Fu-San Shyu, "Optimal Common-Mode Voltage Reduction PWM Technique for Inverter Control With Consideration of the Dead-Time Effects-Part I: Basic Development", IEEE IAS Annual Meeting, 2003.

Yen-Shin Lai, Fu-San Shyu, "Optimal Common-Mode Voltage Reduction PWM Technique for Inverter Control With Consideration of the Dead-Time Effects-Part II: Applications to IM Drives With Diode Front End", IEEE IAS Annual Meeting, 2003.

* cited by examiner

*Primary Examiner*—Paul Ip
(74) *Attorney, Agent, or Firm*—Quarles & Brady LLP; William R. Walbrun (57) ABSTRACT

Methods and apparatus for canceling dead time effects in the form of common mode voltages produced by a three-phase power conversion device in a rectifier/inverter variable frequency drive (VFD) system includes limiting the voltage difference between phase voltages at certain switching transition times to an amount δ, that is a function of the dead time that is specified for the switches and delaying gating signals to the switches to remove unexpected pulses produced by common mode voltages.

11 Claims, 12 Drawing Sheets

CANCELLATION OF DEAD TIME EFFECTS FOR REDUCING COMMON MODE VOLTAGES

CROSS-REFERENCE TO RELATED APPLICATIONS

Not applicable

STATEMENT REGARDING FEDERALLY SPONSORED RESEARCH

Not applicable

TECHNICAL FIELD

The field of the invention is control systems for controlling the operation of AC motors.

BACKGROUND ART

A well known type of AC drive includes an AC-to-DC converter including a boost rectifier for converting three-phase AC source voltages to DC voltages on a DC bus. The DC bus interfaces the AC-to-DC converter to a DC-to-AC inverter, which is typically a three-phase bridge network of solid state switches, which are switched at high frequency to generate pulse width modulation (PWM) or other types of modulated low frequency power signals which are supplied to an AC motor. These systems generate a common mode voltage measured between a neutral in the motor and an electrical ground. These also generate common mode currents in part the result of parasitic capacitances between mechanical parts in the motor and ground, and between mechanical parts in the motor and the stator windings. It is desirable to attenuate or eliminate these common mode voltages to prevent interference that might trip fault protection devices and to reduce common mode currents in motor bearings that might reduce their service life. Passive circuits including filters and transformers have been employed to correct this problem, but with increased production costs and increased installation costs. A number of prior art publications have suggested modifications to inverter modulation methods to control the inverter common mode voltages. This approach has cost and manufacturing advantages over passive circuits.

The inverter switching states can be modeled with the aid of a space vector PWM (SVPWM) theory and diagram more fully described below. Two of the vectors in this theory are zero-voltage switching vectors (V0 and V7). Some prior art methods skip these vectors by using two active vectors that are 180 degrees out of phase. However, these modified modulation schemes require that dwell time (on time for the inverter switches) be calculated in real time.

The dead-time effect, where there is time delay between one phase voltage being turned on or off and the next phase being switched to the opposite state, has been investigated while using different modified modulation schemes. A null state switching sequence without zero-voltage switching vectors has been described in the art to be the optimal common-mode voltage reduction PWM technique. Also, a method to cope with the dead-time effects at the transition of two sectors in the direct-digital SVPWM switching sequence has been described in the art.

It would be advantageous to provide other common-mode voltage reduction methods for a PWM carrier-based modulation that remove the effects of dead time.

SUMMARY OF THE INVENTION

The present invention relates generally to methods for reducing the common mode voltage generated by a rectifier/inverter variable frequency drive system. This invention is more particularly applied in a preferred embodiment to modulation techniques based on carrier-based pulse width modulation (PWM) for common mode voltage reduction. The proposed common mode voltage reduction methods can be applied to carrier-based PWM without calculating the dwell time.

The invention more particularly comprises comparing respective pairs of the phase voltages to each other for selected time periods to determine a voltage difference, δ, and the voltage difference δ, is limited to an amount calculated by the expression:

$$\delta = \frac{V_{bus} T_d}{P_{sw}},$$

where δ is a voltage difference function limit,
where Vbus is the dc link voltage and is also equal to the peak-to-peak amplitude of a carrier wave,
where $P_{sw}$ is a period of the carrier wave, and
where $T_d$ is a dead time that is predetermined for the switches in a power conversion device. Gating signals to switches for the three phases in the power conversion device are then delayed to produce the voltage difference and reduce the dead time effects in facilitating common mode voltages in a motor.

In a more specific embodiment, the invention can be carried out by a microelectronic CPU under control of a stored program routine.

The invention will enable one to reduce the peak-to-peak common mode voltage using a lower cost solution than the prior art.

The invention is applicable to power conversion devices, which include DC-to-AC inverters, AC-to-DC converters and active filter devices.

These and other objects and advantages of the invention will be apparent from the description that follows and from the drawings which illustrate embodiments of the invention, and which are incorporated herein by reference.

DETAILED DESCRIPTION OF THE PREFERRED EMBODIMENTS

Figure 1:
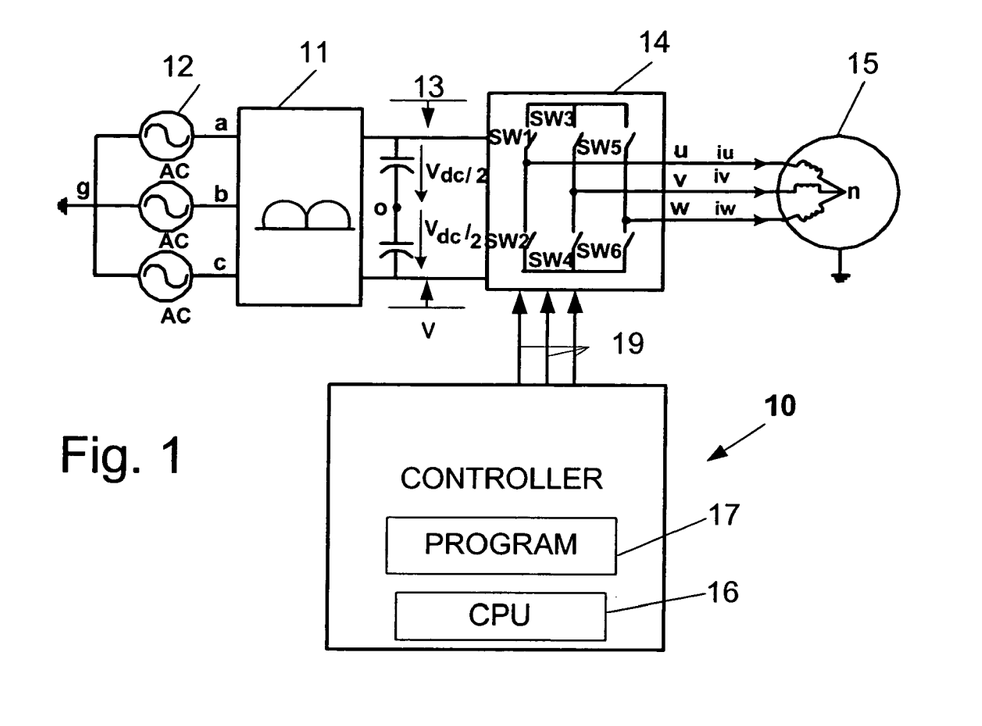
FIG. 1 is a block diagram of a motor drive for practicing the methods of the present invention.

FIG. 1 illustrates a block diagram of an AC drive controller 10 for controlling an AC-to-DC converter 11 including a boost rectifier for converting three-phase AC source voltages from an AC voltage supply 12 to DC voltages, $V_{dc}$, on a DC bus 13. The DC bus 13 interfaces the AC-to-DC converter 11 to a DC-to-AC inverter 14, which is typically a three-phase bridge network of solid state switches SW1–SW6, preferably IGBT's, which are switched at high frequency to generate pulse width modulation (PWM) or other types of modulated low frequency power signals $i_u$, $i_v$, $i_w$, which are supplied to an AC motor 15.

The controller 10 includes a microelectronic CPU 16 operating according to instructions in a control program 17 stored in memory. The program 17 includes instructions for performing regulation of a DC bus voltage and regulation of current supplied to the motor 15. The controller provides gating signals 19 to control the switching of the switches SW1–SW6 in the inverter 14.

The common mode voltage (CMV) is defined in expression 1) below as the voltage difference between a neutral point "n", for example in the motor 15, and the ground "g" for the AC voltage supply 12. It is the sum of the voltage $V_{no}$ between the midpoint "o" of the DC bus and a neutral point "n", for example in the motor 15, and the voltage $V_{og}$ between the midpoint "o" of the DC bus 13 and ground "g" for the AC voltage supply 12. The voltages $V_{no}$ and $V_{og}$ are three-phase voltages summed from the individual phase voltages of the motor 18 and the AC voltage supply 12 as shown in expressions 2) and 3) below.

$$CMV = V_{ng} = V_{no} + V_{og} \quad 1)$$

$$V_{no} = (V_{uo} + V_{vo} + V_{wo})/3 \quad 2)$$

$$V_{og} = -(V_{ao} + V_{bo} + V_{co})/3 \quad 3)$$

The frequency and amplitude of $V_{og}$ is determined by the AC supply mains, which produces a positive 180 Hz (or 150 Hz) ripple waveform and negative 180 Hz (or 150 Hz) ripple waveform in the common mode voltage. Another part of CMV, $V_{no}$, is related to the inverter modulation, and its amplitude is shown in Table 1 below.

TABLE 1

Common mode voltages for diode front-end variable frequency drive system

| Vector | State (G1, G3, G5) | $V_{uo}$ | $V_{vo}$ | $V_{wo}$ | $V_{no}$ |
|---|---|---|---|---|---|
| $V_0$ | 0, 0, 0 | $-V_{dc}/2$ | $-V_{dc}/2$ | $-V_{dc}/2$ | $-V_{dc}/2$ |
| $V_1$ | 1, 0, 0 | $V_{dc}/2$ | $-V_{dc}/2$ | $-V_{dc}/2$ | $-V_{dc}/6$ |
| $V_2$ | 1, 1, 0 | $V_{dc}/2$ | $V_{dc}/2$ | $-V_{dc}/2$ | $V_{dc}/6$ |
| $V_3$ | 0, 1, 0 | $-V_{dc}/2$ | $V_{dc}/2$ | $-V_{dc}/2$ | $-V_{dc}/6$ |
| $V_4$ | 0, 1, 1 | $-V_{dc}/2$ | $V_{dc}/2$ | $V_{dc}/2$ | $V_{dc}/6$ |
| $V_5$ | 0, 0, 1 | $-V_{dc}/2$ | $-V_{dc}/2$ | $V_{dc}/2$ | $-V_{dc}/6$ |
| $V_6$ | 1, 0, 1 | $V_{dc}/2$ | $-V_{dc}/2$ | $V_{dc}/2$ | $V_{dc}/6$ |
| $V_7$ | 1, 1, 1 | $V_{dc}/2$ | $V_{dc}/2$ | $V_{dc}/2$ | $V_{dc}/2$ |

Figure 3:
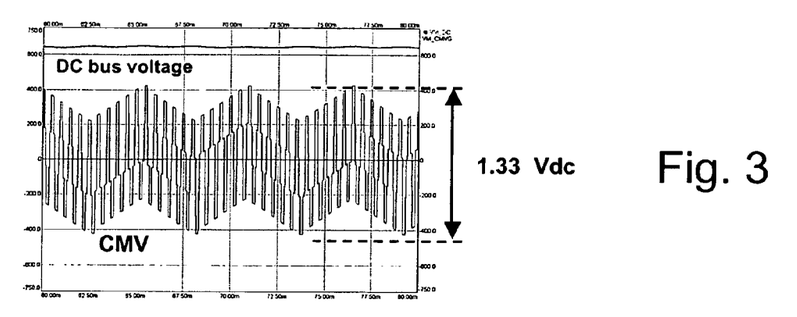
FIG. 3 is a graph of the three-phase common mode voltage (CMV) as a function of time in the system of FIG. 1 without practicing common mode voltage reduction methods.
Figure 4:
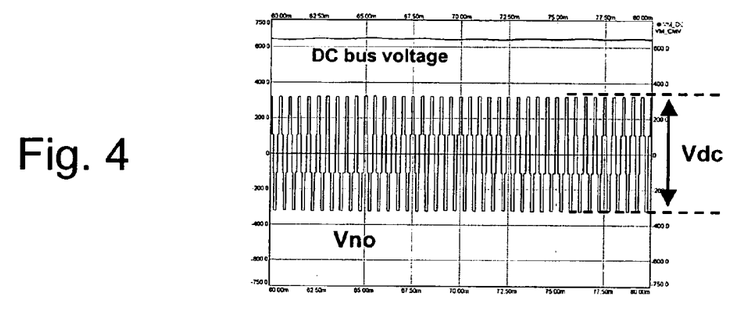
FIG. 4 is a graph of the neutral-to-ground common mode voltages ($V_{no}$) seen in the system of FIG. 1 without practicing common mode voltage reduction methods.

An example of the waveform of both CMV and $V_{no}$ for diode front-end VFD system is shown in FIGS. 3 and 4, respectively. According to the switching states configuration summarized in Table 1 above, instantaneous values of $V_{no}$ of the diode front-end VFD system can be determined from equation 4).

$$V_{no} = \begin{cases} \pm \dfrac{V_{dc}}{2} & \text{for } V_0 \text{ and } V_7 \\ \pm \dfrac{V_{dc}}{6} & \text{for other states} \end{cases} \quad 4)$$

Figure 2:
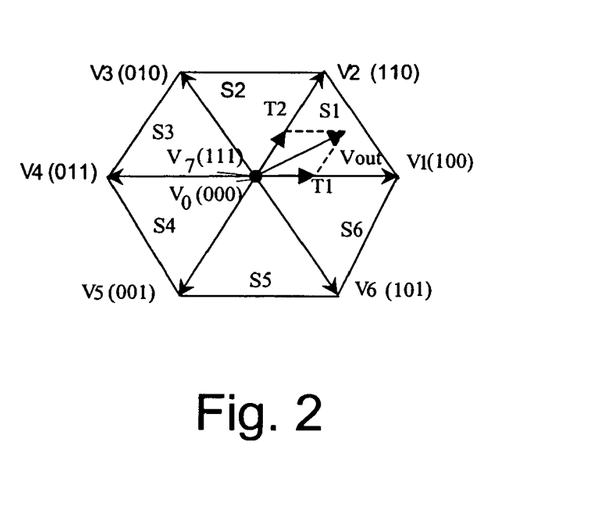
FIG. 2 is a space vector diagram illustrating the direct digital SVPWM principles.

According to the space vector PWM model, there are eight available output voltage vectors (V0–V7) for both the boost rectifier and inverter as shown in FIG. 2. There are two zero-voltage vectors V0, V7 and six non-zero voltage vectors (V1–V6). The transition from each non-zero voltage vector to the next non-zero voltage vector defines one of six states S1–S6 in the circle diagram in FIG. 2.

It is known in the art that the peak-to-peak amplitude of the common mode voltage generated by active front-end variable frequency drive system can be limited to no more than $1.33V_{dc}$, as seen in FIG. 3, by synchronizing the switching sequence.

Some modified modulators for diode front-end VFD system have included a switching pattern modifier that does not select zero-voltage switching vectors (V0, V7) for the switching pattern of inverter control. The virtual zero states are created by using two active vectors that are 180 degree out of phase. As a result, the peak-to-peak amplitude of the common mode voltage can be significantly reduced.

Figure 5:
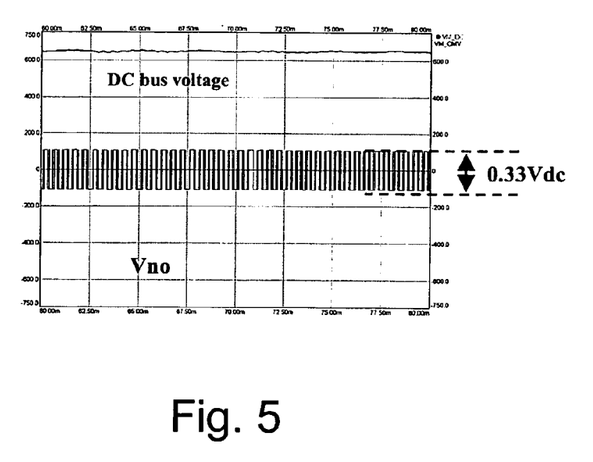
FIG. 5 is a graph of the three-phase common mode voltage (CMV) as a function of time in the system of FIG. 1 with common mode voltage reduction, but without reduction for dead time effects.

Several common mode voltage reduction schemes have been proposed for carrier-based PWM without calculating the dwell time, which can be applied to the modulator of the diode front-end VFD system or to an active front-end VFD system. FIG. 5 shows the $V_{no}$ waveform produced by diode front-end VFD system (without dead time) using modified carrier-based PWM for common mode voltage reduction.

Figure 6:
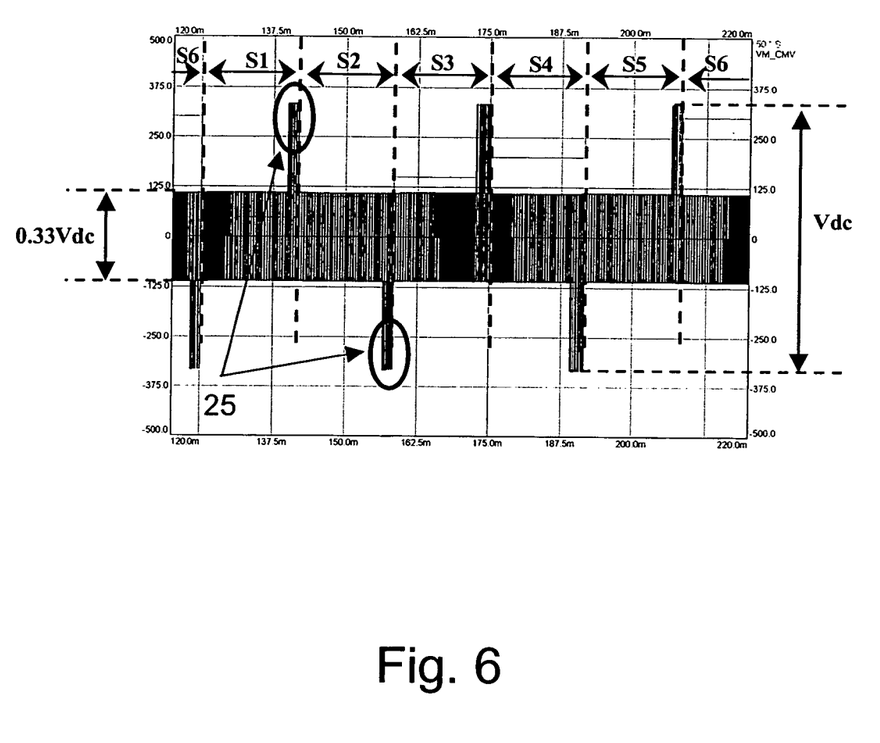
FIG. 6 is a graph of the three-phase common mode voltage (CMV) as a function of time in the system of FIG. 1 with common mode voltage reduction, but also including cancellation of dead time effects.

The modified carrier-based PWM can be applied to the inverter modulator of the diode front-end VFD system, to significantly reduce the peak-to-peak amplitude of the common mode voltage. Due to the effects of dead time, there will be unexpected high amplitude pulses 25 of the common mode voltage, as shown in FIG. 6. It will be shown later that the unexpected pulses actually occur when the voltage difference between two modulating signals is less than twice the dead time. To further analyze the dead-time effect, some transition bands 30, 31 (e.g. S1_2_1, S1_2_2, S6_1_1 and S6_1_6) are shown in a modified space vector diagram in FIG. 7, in which a voltage difference in one sector is less than δ.

Figure 7:
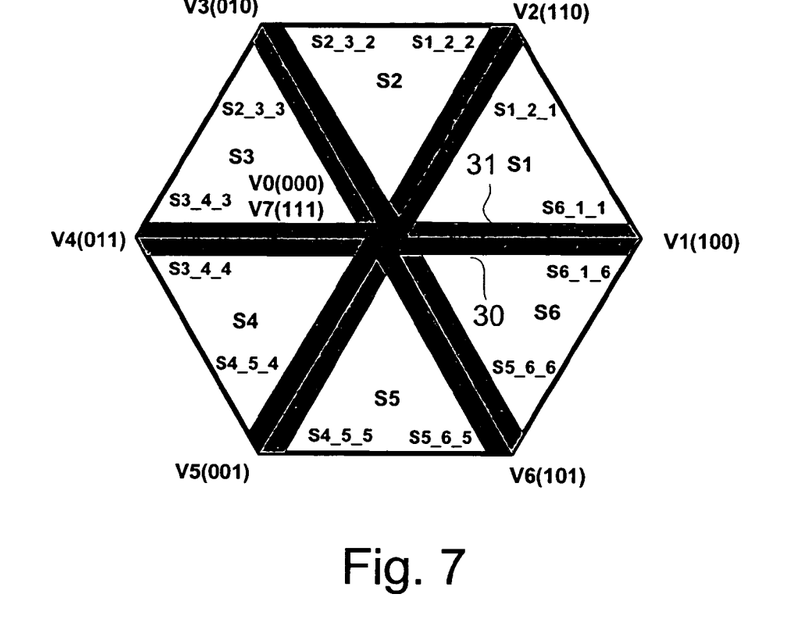
FIG. 7 is a space vector diagram showing transition bands from one sector to another.

In FIG. 7, unexpected pulses of high amplitude (of the type seen in FIG. 6) occur before the transition from one sector S1 or S6 to the next sector, for example (e.g. in the darker transition bands 30 of S1_2_1 and S6_1_6). These bands 30 represent transition zones just before the actual transition between sectors S1–S6.

There are no unexpected pulses of high amplitude (as seen in FIG. 6) after the transition from one sector S1 or S6 to the next sector in FIG. 7, for example (e.g. in the lighter transition bands 31 of S1_2_2 and S6_1_1). These bands 31 represent transition zones just after the transition between sectors.

Figure 8:
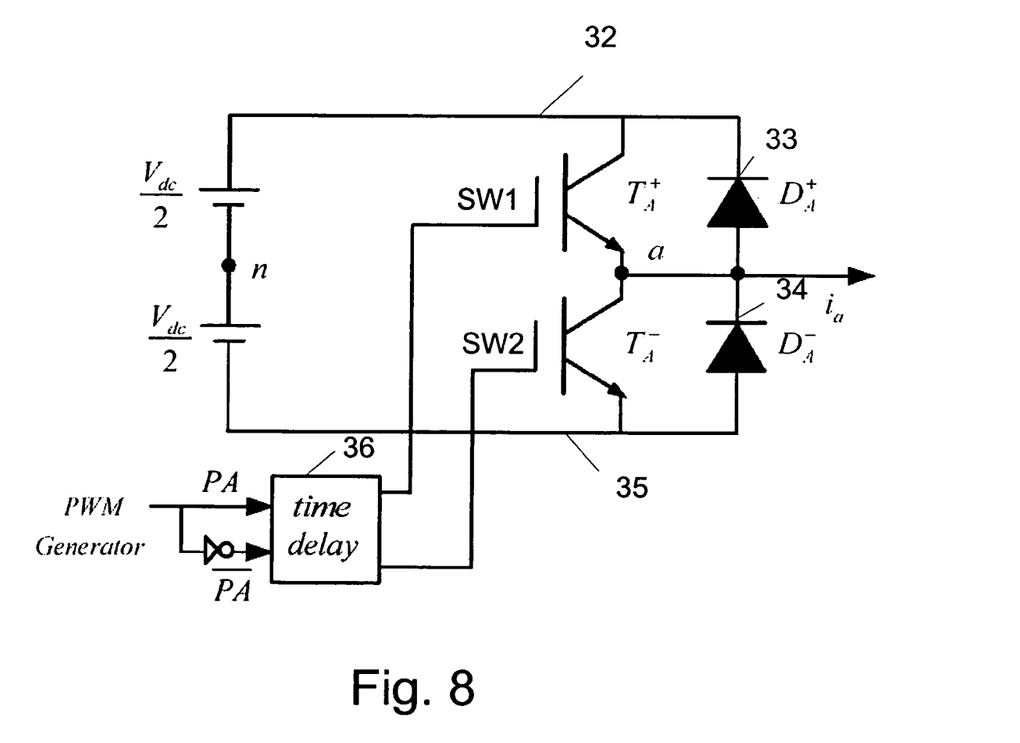
FIG. 8 is a diagram of one leg in an inverter with a time delay being introduced into the switching sequence.

As shown in FIG. 8, each leg of the inverter 14 includes two switches, such as switches SW1 and SW2, which are operated with an optional time delay provided by time delay circuit 36 to control dead time. During the period of dead time (free-wheeling period), the output voltage is clamped to the negative DC-link rail 35 by the low-side anti-parallel diode 34 for providing a positive line current. In contrast, when the current is negative, the output voltage is clamped to the positive DC-link rail 32 by the up-side anti-parallel diode 33 during a free-wheeling period. This narrows the width of the positive or negative phase voltage pulse from what it otherwise would be without dead time effects.

Figure 9:
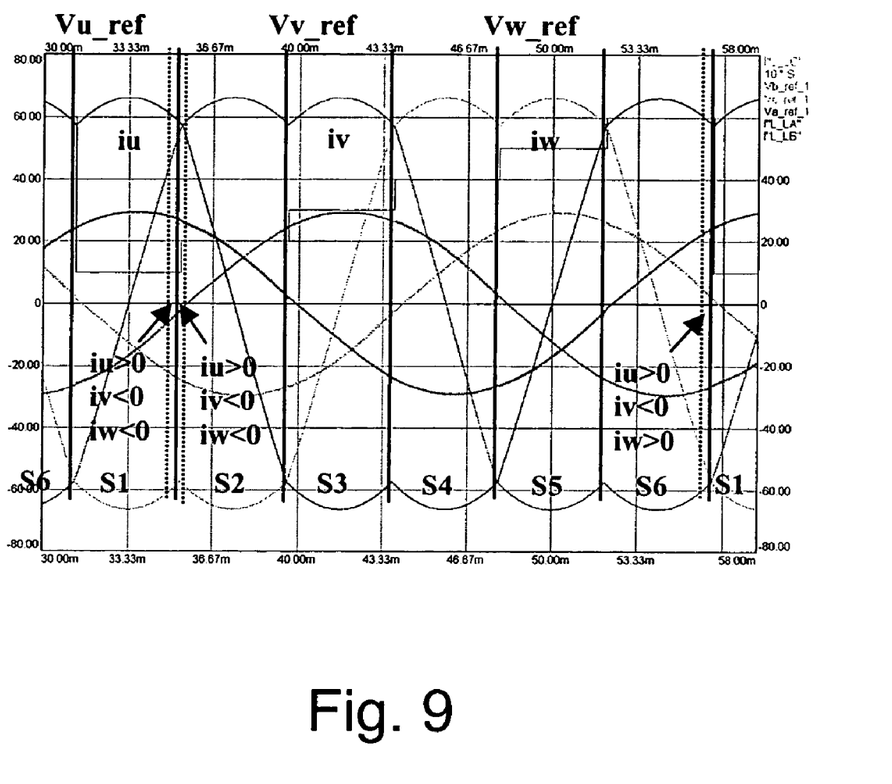
FIG. 9 is a graph of phase voltages and phase currents vs. time over six sectors of inverter switching showing three sector transitions.

FIG. 9 shows the currents for the three phases, $i_u$, $i_v$ and $i_w$, over the six sectors, S1–S6, and especially in the transition zones from sector S1 and S2 and the transition zone from sector S6 to S1.

Figure 10:
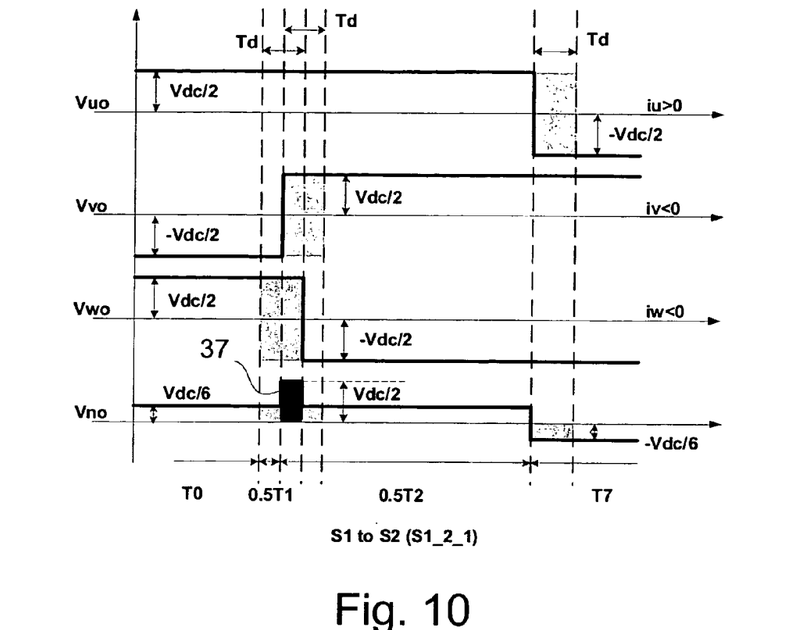
FIGS. 10–12 are graphs of phase voltage diagrams as a function of time and in relation to DC bus voltage for three specific sector transitions.

FIG. 10 shows the dead-time effect analysis in the transition zone S1_2_1 (before the transition from sector S1 to sector S2), where $V_{uo}$, $V_{vo}$, $V_{wo}$ and $V_{no}$ represents the inverter output phase "u" voltage, the inverter output phase "v" voltage, the inverter output phase "w" voltage and the common-mode voltage respectively. "$T_d$" represents the dead time, which is specified as a function of the particular switching devices used in the inverter 14. When the motor current of phase "u"—"$i_u$" is positive, and motor currents of phase "v" and phase "w"—"$i_v$" and "$i_w$" are negative (as shown in FIG. 9) and when one of the voltage differences (Vv–Vw) is less than δ, an unexpected positive pulse 37 of common mode voltage occur with the peak amplitude of +$V_{dc}/2$ as seen in FIG. 10.

Figure 11:
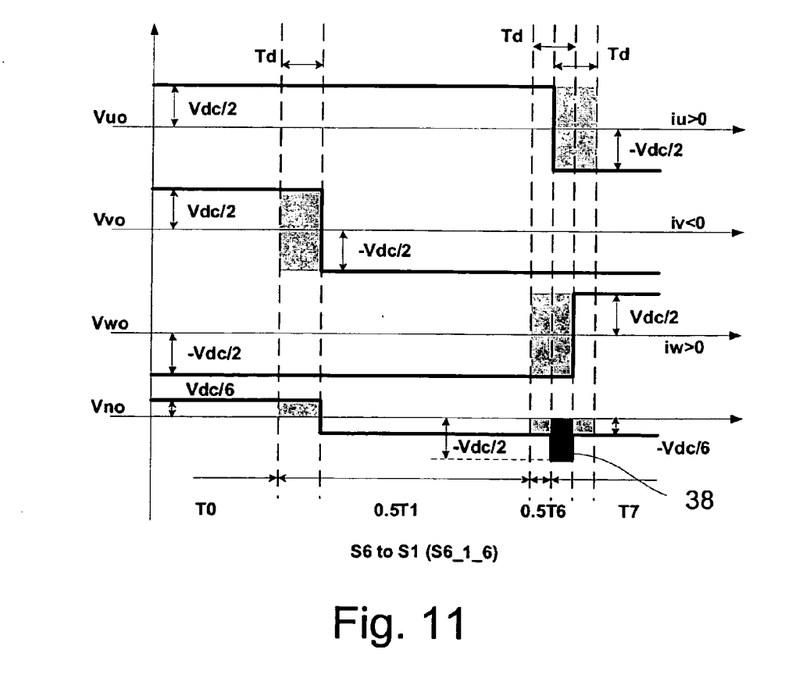

The same analysis can be applied to the dead-time effect in area S6_1_6 (before the transition from sector 6 to sector 1), as shown in FIG. 11. When the motor currents "$i_u$" and "$i_w$" of phase "u" and phase "w" are positive, and the motor current "$i_v$" and "$i_w$" of phase "v"—is negative (as shown in FIG. 9) and when one of the voltage differences (Vu–Vw) is less than δ, an unexpected negative pulse 38 of common mode voltage occur with the peak amplitude of $-V_{dc}/2$.

Figure 12:
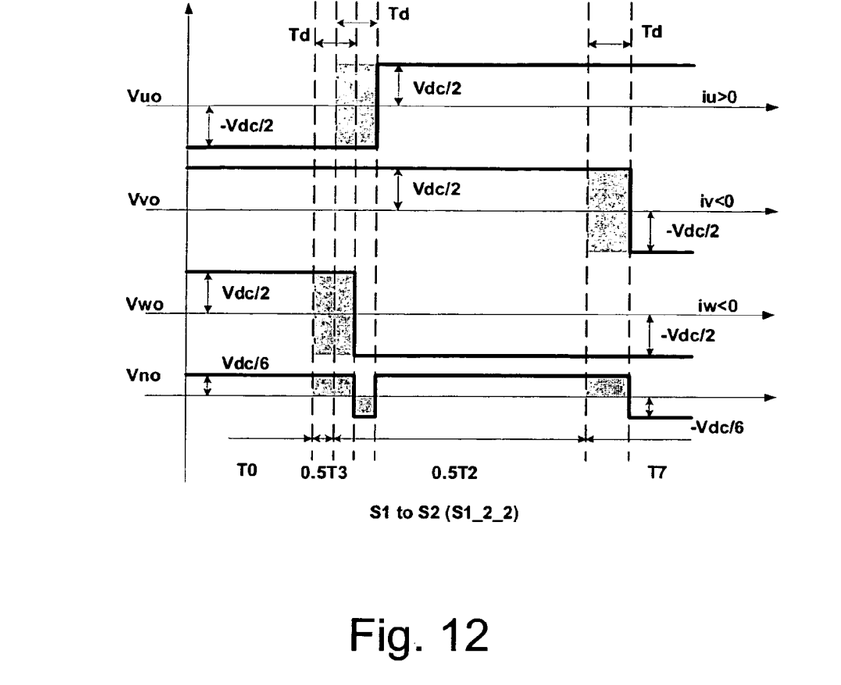

Dead-time effect analysis for those small areas after the transition of two sectors (e.g. S1_2_2) is presented in FIG. 12. There are no unexpected pulses of high amplitude after the transition of two sectors.

Figure 13:
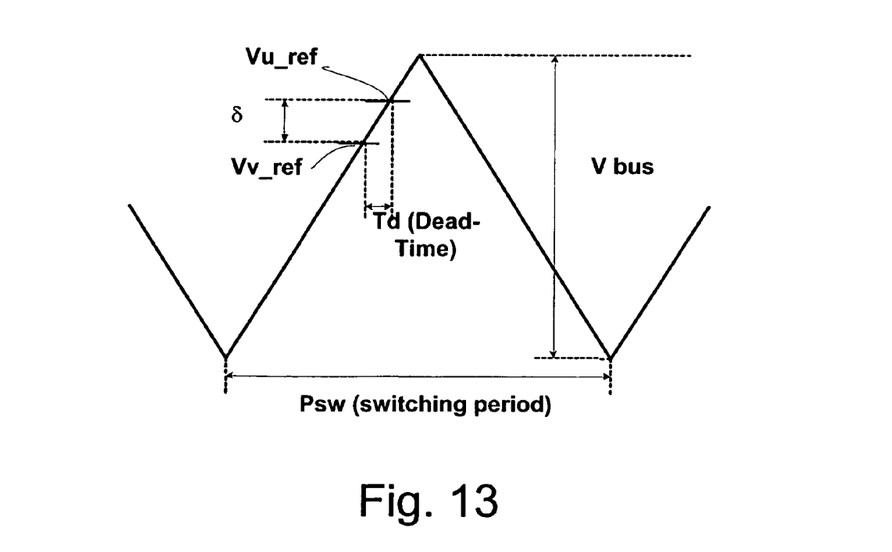
FIG. 13 is a diagram showing the calculation of a voltage difference, δ, as a function of an amplitude of the triangular carrier wave, the dead time and the switching period.
Figure 14:
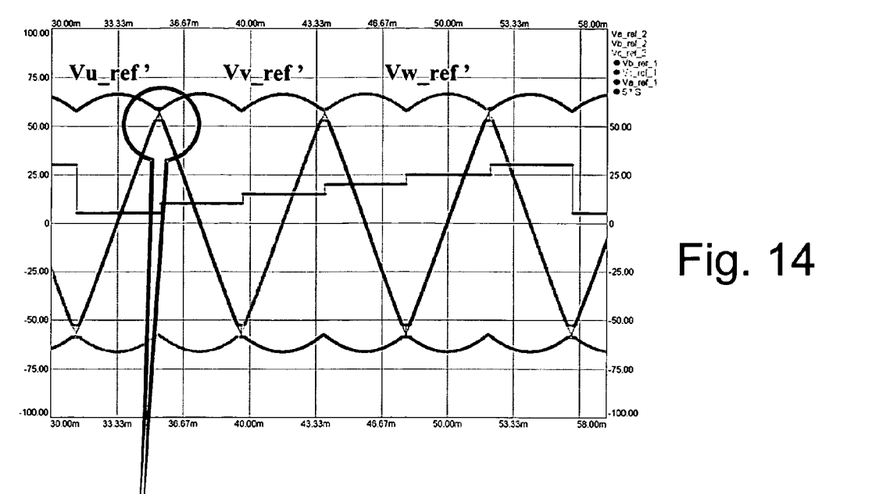
FIGS. 14 and 15 are diagrams showing correction of the phase voltages based on the voltage difference function.
Figure 15:
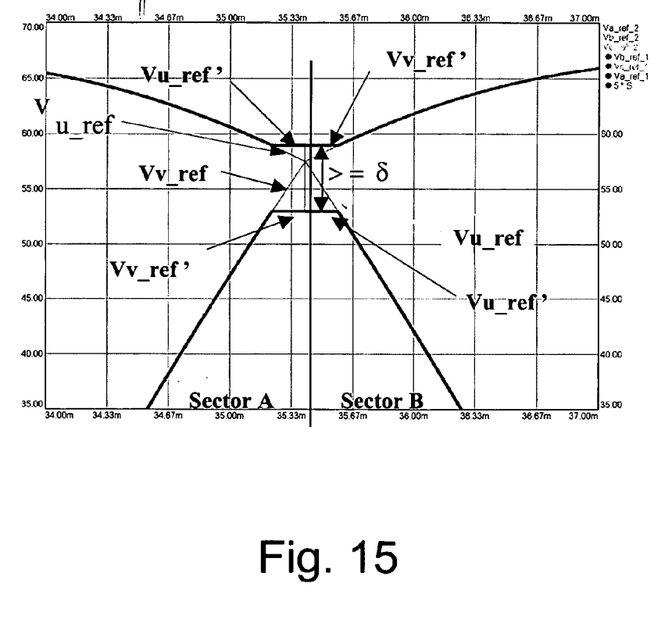

To cancel the dead-time effect caused by the modified carrier-based PWM, the original three phase reference voltage $V_{u\_ref}$, $V_{v\_ref}$ and $V_{w\_ref}$ can be modified to $V_{u\_ref'}$, $V_{v\_ref'}$ and $V_{w\_ref'}$ as shown in FIGS. 14 and 15. This gate firing routine in the control program 17 limits the minimum duration of non-zero switching states by setting a voltage difference signal to be the difference between two original reference voltages during each of the sector transitions. The voltage difference limit, δ, can be calculated by equation 5) in which $T_d$ is the dead time required by the switching devices S1–S6, where $V_{bus}$ is the amplitude of the DC bus voltage and is also the peak-to-peak amplitude of the carrier wave, and where $P_{sw}$ is the period of the carrier wave in FIG. 13.

$$\delta = \frac{V_{bus} T_d}{P_{sw}} \quad (5)$$

As seen in FIGS. 14 and 15, when the difference between two reference voltages $V_{u\_ref}$ and $V_{v\_ref}$ is less than the error, these voltages are modified to $V_{u\_ref'}$ and $V_{v\_ref'}$ which differ by at least the difference, δ, to implement the required dead time. During the sector transition times, where the voltages would intersect in FIG. 14, if when the difference becomes less than δ, then each reference is clamped to fix the difference to δ, as shown in FIG. 15. This can be carried out by the CPU 16 through execution of program a program routine in the control program 17 as illustrated in FIG. 16.

Figure 16:
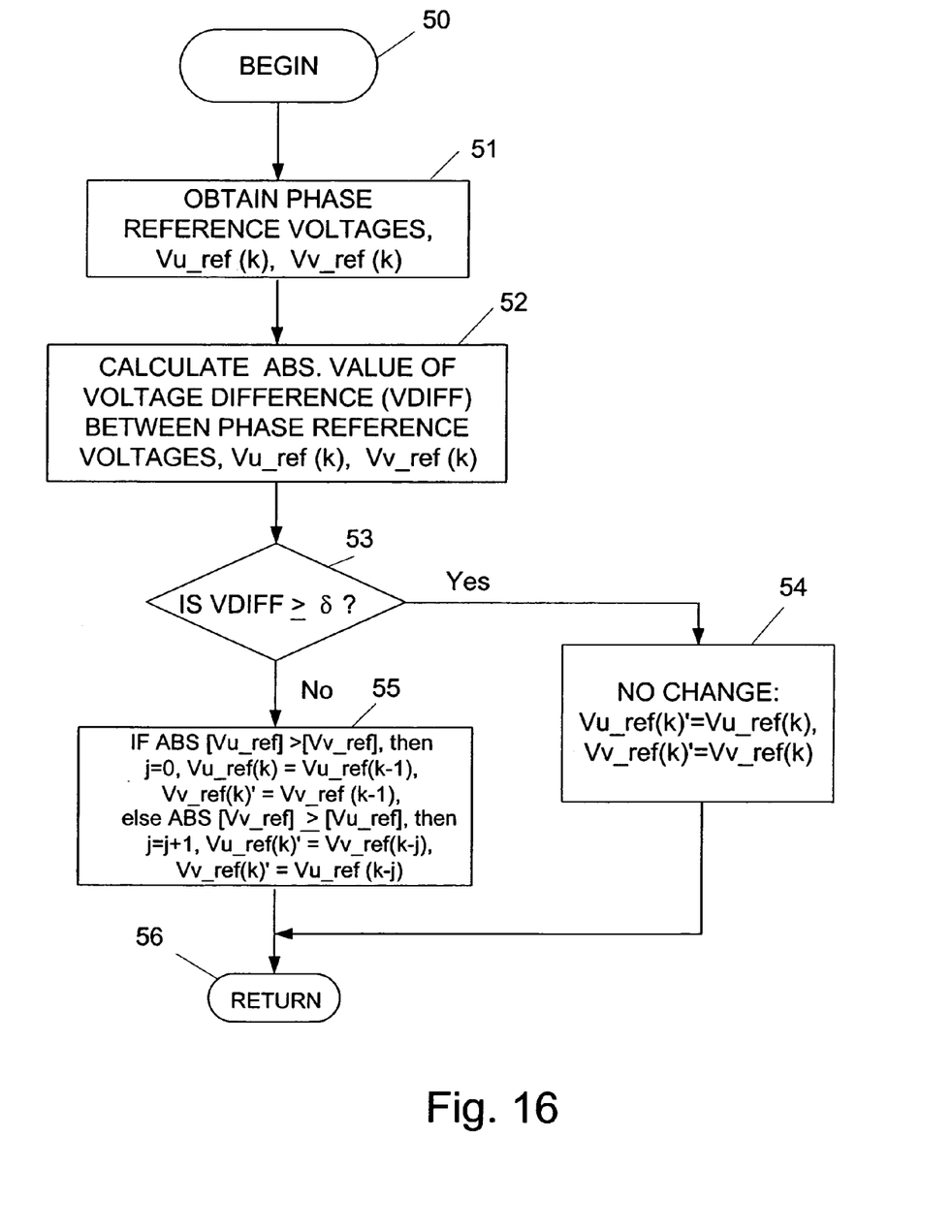
FIG. 16 is a flow chart of a program routine for carrying out the present invention.

Referring to FIG. 16, the program routine is initiated by one or more program instructions represented by start block 50. Next, as represented by process block 51, representing one or more program instructions, the CPU 16 gets the original reference voltages, for example, $V_{u\_ref}(k)$, $V_{v\_ref}(k)$ for time period "k". As represented by process block 52, the CPU 16 then calculates an absolute value of the difference between these two voltages. As represented by decision block 53, it then compares the calculated difference to the minimum difference function, δ. If the calculated difference ($V_{DIFF}$) is greater than or equal to the difference minimum, δ, as represented by the "Yes" result from decision block 53, then the phase voltages remain unchanged, and this is represented by process block 54. If the difference ($V_{DIFF}$) is less then the difference minimum, δ, as represented by the "No" result from decision block 53, then the phase voltages are processed as represented by process block 55.

In block 55, the routine proceeds to determine if the time period is in zone 30 preceding the transition between sectors of the diagram in FIG. 7, or in the zone 31 following the transition between sectors of the diagram in FIG. 7. If the absolute value of $V_{u\_ref}$ is greater than the absolute value of $V_{v\_ref}$, and the difference is too small, then the phase voltage values are held at their previous values $V_{u\_ref}(k-1)$ and $V_{v\_ref}(k-1)$ which satisfied the difference function. If the absolute value of $V_{v\_ref}$ is greater than the absolute value of $V_{u\_ref}$, and the difference function is not satisfied, then the switching is in a different transition zone between sectors. In this case, $V_{u\_ref'}$, a modified voltage, is modified to the value of $V_{v\_ref}(k-j)$, and $V_{v\_ref'}$ is modified to the value of $V_{u\_ref}(k-j)$, where "k–j" is a time which is before crossing the sector boundary that caused the absolute value of $V_{v\_ref}$ to be greater than the absolute value of $V_{u\_ref}$.

The routine will then be repeated for the other pairs of phase reference voltages, $V_{v\_ref}$–$V_{w\_ref}$ and $V_{u\_ref}$–$V_{w\_ref}$. After processing the three voltage pair comparisons, the routine returns, as represented by return block 56, to a larger routine in which a duty cycle is calculated for the gate firing pulses and PWM modulation is performed to produce the gate firing pulses by comparing each reference phase voltage to a triangular carrier wave.

Figure 17:
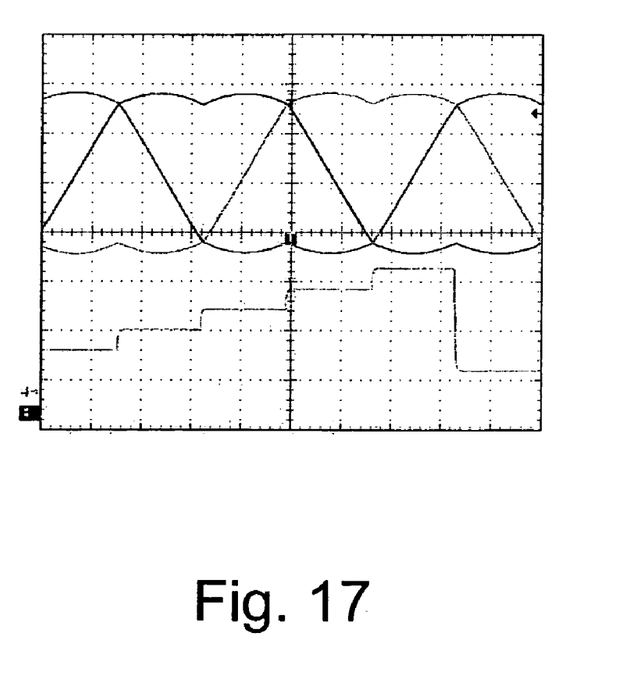
FIGS. 17 and 18 show graphs of the phase voltages with and without correction for dead time effects.
Figure 18:
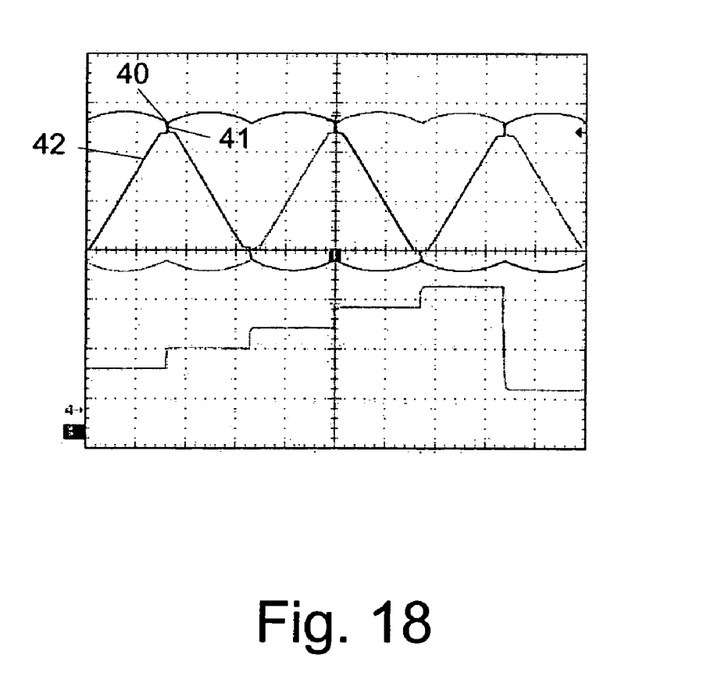

FIGS. 17 and 18 show some test waveforms. In FIG. 17, the three phase waveform is shown without cancellation of dead time effects. In FIG. 18, the modified phase reference voltages are shown for cancellation of dead time effects. There is a discontinuity 41 representing the difference between the phase voltages 40 before adjustment for the "δ" amount and the phase voltages 42 after adjustment for the voltage difference limit.

Figure 19:
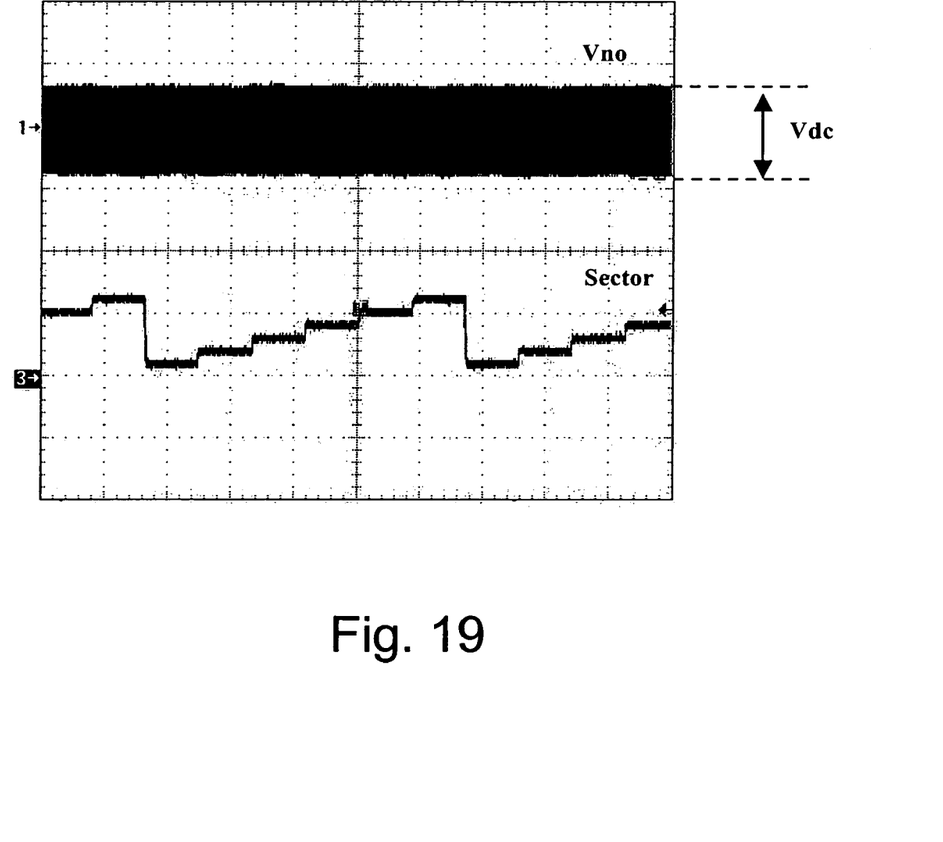
FIGS. 19–21 are graphs showing the common mode voltage as a function of the sector switching and dead time effects.
Figure 20:
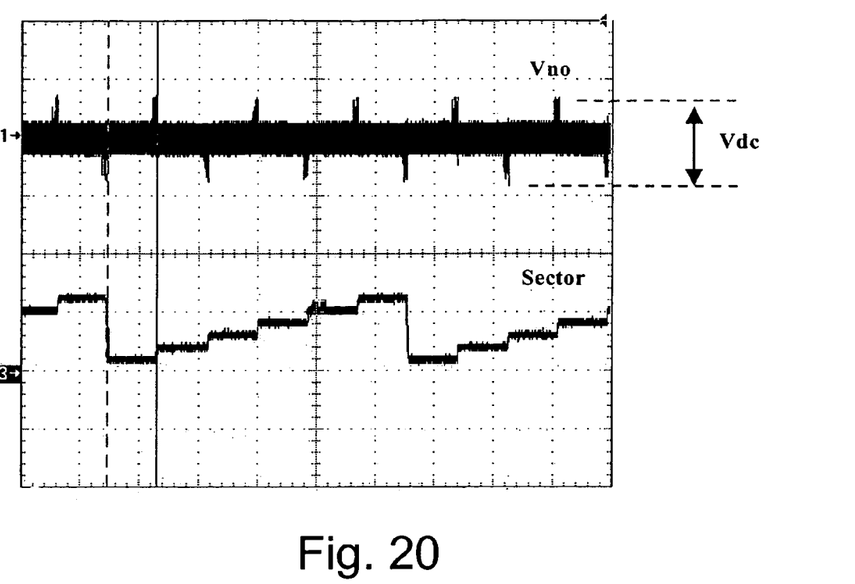
Figure 21:
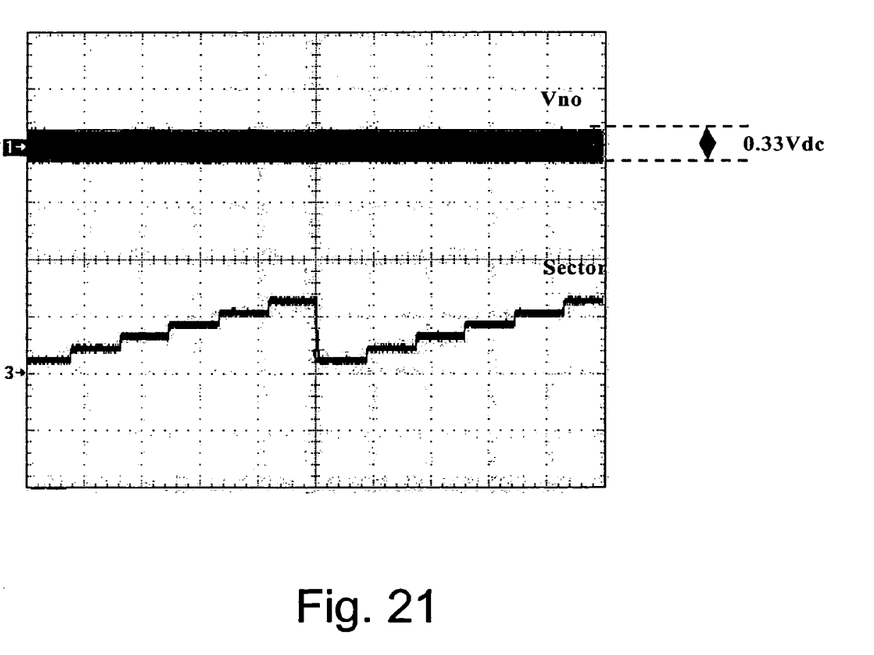

As shown in FIG. 19, the peak-to-peak amplitude common mode voltage $V_{no}$ of the diode front-end VFD system is equal to DC bus voltage $V_{dc}$ when the conventional carrier-based PWM is used. When the modified carrier-based PWM is used, the majority of the common mode voltage $V_{no}$ is significantly reduced, but there are still some dead-time effects (unexpected pulses) when the dead-time effect cancellation scheme is disabled (as shown in FIG. 20). By using the modified carrier-based PWM and the dead-time effect cancellation method disclosed herein, the peak-to-peak amplitude common mode voltage $V_{no}$ of the diode front-end VFD system can be restricted to be no more than 0.33 $V_{dc}$ (as shown in FIG. 21).

This has been a description of several preferred embodiments of the invention. It will be apparent that various modifications and details can be varied without departing from the scope and spirit of the invention, and these are intended to come within the scope of the following claims.

We claim:

1. A method of controlling switching in a three-phase power conversion device to reduce a common mode voltage, the method comprising:
    comparing respective pairs of the phase voltages to each other for a period of a carrier wave to determine a voltage difference; and
    limiting the voltage difference to an amount calculated by the expression:

$$\delta = \frac{V bus T_d}{P_{sw}},$$

where δ is a voltage difference function limit,
where $V_{bus}$ is a dc bus voltage that determines a peak-to-peak amplitude of the carrier wave,
where $P_{sw}$ is the period of the carrier wave, and
where $T_d$ is a dead time that is predetermined for switches in the power conversion device;
    comparing the carrier wave to three respective phase voltages to determine active periods for gating signals to be transmitted to the switches in the power conversion device; and
    delaying gating signals to the switches in the power conversion device to maintain the voltage difference and to inhibit production of common mode voltage pulses.

2. The method of claim 1, wherein the comparing of respective pairs of the phase voltages to each other for a period of the carrier wave to determine a voltage difference and wherein the limiting of the voltage difference between phase voltages is performed by a microelectronic CPU under control of a stored program routine.

3. The method of claim 1, wherein the power conversion device is a DC-to-AC inverter.

4. The method of claim 1, wherein the comparing the carrier wave to three respective phase voltages to determine active periods for gating signals to be transmitted to the switches in the power conversion device is pulse width modulation that is performed by comparing the phase voltages to a triangular carrier wave.

5. The method of claim 1, wherein a common mode voltage ($V_{no}$), which is defined as being between a neutral point in the motor and a midpoint of a DC bus supplying a bus voltage, $V_{dc}$, to the inverter, is limited to 0.33 $V_{dc}$.

6. A controller for controlling switching in a three-phase power conversion device to reduce a common mode voltage, the controller comprising:
    a comparator for comparing respective pairs of phase voltages to each other for a period of a carrier wave to determine a voltage difference;
    a voltage limiter for limiting the voltage difference to an amount calculated by the expression:

$$\delta = \frac{V bus T_d}{P_{sw}},$$

where δ is a voltage difference function limit,
where $V_{bus}$ is a dc bus voltage that determines a peak-to-peak amplitude of the carrier wave,
where $P_{sw}$ is the period of the carrier wave, and
where $T_d$ is a dead time that is predetermined for switches in the power conversion device;
    a delay circuit for delaying gating signals to the switches in the power conversion device; and
    a control circuit for comparing the phase voltages for three phases to the carrier wave to determine a plurality of gating signals for switches in the power conversion device, the control circuit transmitting the gating signals to the delay circuit to maintain the voltage difference which inhibits production of common mode voltage pulses in the motor.

7. The controller of claim 6, wherein the voltage limiter and the control circuit are included in a microelectronic CPU executing a control program.

8. The controller of claim 7, wherein the microelectronic CPU compares respective pairs of the phase voltages to each other for respective periods of the carrier wave to determine a voltage difference and limits said voltage difference as a function of dead time for each period of the carrier wave.

9. The controller of claim 6, wherein the phase voltages for three phases are compared to the carrier wave to perform pulse width modulation to provide pulses for turning on switches in the power conversion device.

10. The controller of claim 6, wherein the power conversion device is a DC-to-AC inverter.

11. The controller of claim 6, wherein a common mode voltage ($V_{no}$), which is defined as being between a neutral point in the motor and a midpoint of a DC bus supplying a bus voltage, $V_{dc}$, to the inverter, is limited to 0.33 $V_{dc}$.

* * * * *